(12) United States Patent
Sabbagh et al.

(10) Patent No.: US 7,471,405 B2
(45) Date of Patent: Dec. 30, 2008

(54) AUGMENTED OPERATING SYSTEM PRINTING ARCHITECTURE

(75) Inventors: Raymond J. Sabbagh, Harbor City, CA (US); Timothy Graney, Mendon, NY (US); Evral E. Bodden, Hawthorne, CA (US); Gregory R. Conway, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1643 days.

(21) Appl. No.: 09/771,737

(22) Filed: Jan. 29, 2001

(65) Prior Publication Data

US 2002/0101600 A1 Aug. 1, 2002

(51) Int. Cl.
*G06F 15/00* (2006.01)
*G06F 15/16* (2006.01)

(52) U.S. Cl. .................... 358/1.15; 709/223

(58) Field of Classification Search ............ 358/1.16, 358/1.15, 1.13, 1.18, 402; 709/226, 201, 709/203, 219, 220, 223, 250; 718/100, 101; 707/1, 10
See application file for complete search history.

(56) References Cited

U.S. PATENT DOCUMENTS

| | | | |
|---|---|---|---|
| 5,930,350 A * | 7/1999 | Johnson | 379/355.06 |
| 5,995,723 A | 11/1999 | Sperry et al. | |
| 6,088,120 A | 7/2000 | Shibusawa et al. | |
| 6,621,589 B1 * | 9/2003 | Al-Kazily et al. | 358/1.15 |
| 6,874,034 B1 * | 3/2005 | Hertling | 709/245 |
| 2001/0025274 A1 * | 9/2001 | Zehr et al. | 705/402 |

OTHER PUBLICATIONS

Driver Development Kit (DDK) for Windows 2000 Printing Architecture, Microsoft Corp., 2000, Chap. 1, printed from http://www.microsoft.com/DDK/DDKdocs/Win2k/printro_592f.htm on Nov. 30, 2000.

Driver Development Kit (DDK) for Windows 2000 Printing Architecture, Microsoft Corp., 2000, Chap. 2, printed from http://www.microsoft.com/DDK/DDKdocs/Win2k/splarch_6tuv.htm et. seq. on Nov. 30, 2000.

Driver Development Kit (DDK) for Windows 2000 Printing Architecture, Microsoft Corp., 2000, Chap. 3, printed from http://www.microsoft.com/DDK/DDKdocs/Win2k/drvarch_3ijr.htm et. seq. on Nov. 30, 2000.

(Continued)

*Primary Examiner*—Saeid Ebrahimi Dehkordy
(74) *Attorney, Agent, or Firm*—Fay Sharpe LLP

(57) ABSTRACT

An augmented operating system printing architecture is provided to permit certain print job attributes from a client to have a desired effect on a print server in a networked environment. The augmented operating system printing architecture includes: 1) an augmented print driver for collecting certain print job attributes and for rendering the print job, 2) an augmented print spooler for processing the print job and for directing the print job to a target device, and 3) an agent service to enable print job attributes collected on the client when a print job is initiated to be used by the print server when the print job is processed. The augmented operating system printing architecture also permits print jobs to be sent to multiple recipients. The augmented print spooler creates multiple copies of the print job when it is directed to multiple recipients, one copy for each recipient.

1 Claim, 3 Drawing Sheets

OTHER PUBLICATIONS

Driver Development Kit (DDK) for Windows 2000 Printing Architecture, Microsoft Corp., 2000, Chaps. 4, printed from http://www.microsoft.com/DDK/DDKdocs/Win2k/nt5gpd_4mcn.htm et. seq. on Nov. 30, 2000.

Driver Development Kit (DDK) for Windows 2000 Printing Architecture, Microsoft Corp., 2000, Chap. 5, printed from printed from http://www.microsoft.com/DDK/DDKdocs/Win2k/pscript_3jfr.htm et. seq. on Nov. 30, 2000.

Driver Development Kit (DDK) for Windows 2000 Printing Architecture, Microsoft Corp., 2000, Chap. 7, printed from printed from http://www.microsoft.com/DDK/DDKdocs/Win2k/custdrv_6o13.htm et. seq. on Nov. 30, 2000.

Driver Development Kit (DDK) for Windows 2000 Printing Architecture, Microsoft Corp., 2000, Chap. 8, printed from http://www.microsoft.com/DDK/DDKdocs/Win2k/provider_2d2f.htm et. seq. on Nov. 30, 2000.

Driver Development Kit (DDK) for Windows 2000 Printing Architecture, Microsoft Corp., 2000, Chap. 11, printed from http://www.microsoft.com/DDK/DDKdocs/Win2k/cpsui_2q3r.htm et. seq. on Nov. 30, 2000.

Driver Development Kit (DDK) for Windows 2000 Printing Architecture, Microsoft Corp., 2000, Graphics Driver Glossary, printed from http://www.microsoft.com/DDK/DDKdocs/Win2k/glossary_12pl.htm et. seq. on Nov. 30, 2000.

* cited by examiner

AUGMENTED OPERATING SYSTEM PRINTING ARCHITECTURE

FIELD OF THE INVENTION

The present invention relates generally to operating system printing architectures and, more particularly, to augmenting the Windows® 2000 printing architecture to permit certain print job attributes from a client to have a desired effect on a print server and to permit print jobs to be sent to multiple recipients.

BACKGROUND OF THE INVENTION

Microsoft® Windows® 2000 is a commercial operating system for use in computers with 133 MHz or higher Pentium-compatible processors, particularly in a networked environment (Microsoft and Windows are trademarks of Microsoft Corp., Redmond, Wash.). Additional information about Windows® 2000 is available from the Microsoft® web site at <http://www.microsoft.com>.

FIG. 1 shows a block diagram of a standard version of a Windows® 2000 printing architecture 10 for a universal print driver and a postscript print driver. The Windows® 2000 operating system includes a graphics device interface (GDI) 15 library of services and functions to perform a host of drawing and graphic-related operations when applications require graphic support. The Windows® 2000 printing architecture 10 utilizes a number of GDI 15 functions and includes a print driver 20 and a print spooler 25. The print driver 20 is further comprised of one or more printer description files (i.e., one or more generic printer description (GPD) files for the universal print driver and one or more postscript printer description (PPD) files for the postscript print driver) 30, a user interface (UI) 35, and a renderer 40. The print spooler 25 is further comprised of a network print provider 45 and a local print provider 50. The local print provider 50 further includes a print provider 52, a process for determining if the print job is in enhanced metafile (EMF) format 55, an EMF print processor 60, a language monitor 65, one or more port monitors 70, and a port driver 75. A process for determining if the print job is in EMF format and selected for spooling 17 determines whether the print job is routed from GDI 15 to the print driver 20 or from GDI 15 to the print spooler 25.

The print driver 20 is installed on the computer along with the Windows® 2000 operating system. An operator may set up the print driver 20 to submit print jobs to a local print queue or to a remote print queue. The local print queue option is available for printers connected directly to a port on the local computer or printers connected directly to a network. If a print driver 20 is set up to print to a local print queue, the Windows® 2000 printing architecture 10 permits the local print queue to also be shared as a network resource. If a local print queue is shared, the local computer effectively becomes a print server for the shared printer. In regard to the print server, the remaining computers on the network are referred to as clients. The remote print queue option is available for print drivers 20 on any such client for any shared printer on the network. When a client user sends a print job to a remote print queue, the local print spooler 25 routes the print job to the network print provider 45. The network print provider 45 on the client transmits the print job to the local print provider 50 on the print server. Accordingly, the print spooler 25 may process print jobs from the local computer (print server) and print jobs from remote computers (clients), depending on the particular printing equipment available and the particular setup of the print drivers 20 on both the print server and the clients.

Regardless of the source of the print job, the local print provider 50 on the print server receives the print job for printing on its local printer. The print provider 52 schedules the print job, spools the print job, and provides job control and printer management capabilities. Next, a process determines if the print job is in EMF or RAW format 55. Print jobs in RAW format can be printed without further processing. A print job in EMF format includes graphics function calls and data and must be rendered in RAW format prior to printing. If the print job is in RAW format, it is sent to the language monitor 65 or the port monitor 70. However, if the print job is in EMF format it is sent to the EMF print processor 60 and routed to the GDI 15 and print driver 20 on the print server for rendering in RAW format.

Most applications initiate print jobs in EMF format because the print job is more compressed and permits a quicker return to the application. Such print jobs must be recycled by the print spooler 25 to the GDI 15 and print driver 20 for rendering in RAW format. Consequently, since most print jobs are in EMF format, most print jobs are recycled for rendering. Under the Windows® 2000 printing architecture 10, client work stations send print jobs to print servers in EMF format because EMF-formatted print jobs can be sent over the network more quickly than RAW-formatted print jobs. Consequently, print jobs sent by clients to the print server are spooled by the local print provider 52 and routed to the GDI 15 and print driver 20 on the print server to be rendered in RAW format. Again, once the print job is in RAW format it is routed to either the language monitor 65 or the port monitor 70. The port monitor 70 manages the configuration of the printer ports, translates the print job into the proper communication protocol for its destination printer port, and directs the print job to the appropriate port driver 75. The language monitor 65 is a type of port monitor 70 that also can add printer control information to the print job and provides a full duplex communication path between the print spooler 25 and a target device. The port driver 75 manages the communication to the printer via the printer port.

The print driver 20 and many components of the print spooler 25 (e.g., network print provider 45, language monitor 65, and port monitor 70) of the Windows® 2000 printing architecture 10 are designed to be replaceable and/or to interface with add-on plug-in modules to enable support to be added for new printers and for enhancements beyond the standard functionality provided along with the operating system. Support for a new printer usually only requires the creation of custom printer description files (i.e., GPD files for the universal print driver; PPD files for the postscript print driver) 30 for use with the print driver 20 supplied by Microsoft®. The behavior of the print driver 20 or print spooler 25 can also be customized by creating replacement software modules and/or plug-in modules to provide enhancements and advanced functionality.

However, several deficiencies have been identified in the Windows® 2000 printing architecture 10 that cannot be overcome by merely customizing the print driver 20 or print spooler 25 components or adding custom printer description files 30. One such problem is generally related to the networked environment. In the networked environment, if the UI 35 collects document-specific or device-specific print job attributes, such print job attributes are not provided to the renderer 40 on the print server when the EMF-formatted print job is rendered in RAW format. For example, the UI 35 may collect user-defined print job attributes from the client user at the time the print job is initiated (e.g., fax recipient list, print job accounting information, etc.), however, the information is not included in the EMF-formatted print job transmitted to the print server. As another example, the same problem occurs when the UI 35 automatically collects print job attributes (e.g., print job accounting information, etc.) at the time the print job is initiated. A second problem identified in the Windows® 2000 printing architecture 10 is related to sending a print job to multiple recipients (e.g., sending the print job as a fax via modem to multiple recipients). More specifically, neither the renderer 40 nor an associated plug-in module in any Windows® 2000 print driver 20 supports rendering a print job to multiple recipients.

Accordingly, there is a need to augment the Windows® 2000 printing architecture 10 with software modules that: 1) permit certain print job attributes either collected automatically or provided by a user at the time a print job is initiated on a client to be transmitted to the print server and accessed during rendering of the print job in RAW format on the print server and 2) permit print jobs to be sent to multiple recipients in both local print queues and remote print queues.

BRIEF SUMMARY OF THE INVENTION

The present invention provides an augmented operating system printing architecture, including: 1) a standard print driver with enhancements for collecting a plurality of print job attributes when a print job is initiated on a client in a networked environment, for communicating said print job attributes to a print server in the networked environment, and for rendering said print job according to such print job attributes on the print server and 2) an agent service on the print server for receiving and at least temporarily retaining the print job attributes communicated from the client.

The present invention also provides an augmented operating system printing architecture, including: 1) a standard print driver with enhancements for collecting a plurality of print job attributes when a print job is initiated on a computer using a local print queue, for communicating said print job attributes and said print job to a standard print spooler with enhancements, and for rendering said print job according to such print job attributes and 2) a standard print spooler with enhancements for controlling and managing the processing of the print job, and for directing the print job to a target device.

The present invention also provides a business-to-business accounting system for controlling and monitoring print job accounting information, comprising: 1) an augmented Windows® 2000 printing architecture for collecting and processing a plurality of print job attributes related to print job accounting, further including: a) an augmented print driver user interface for collecting the print job attributes, b) an augmented print driver renderer for rendering the print job attributes in a print job, and c) an augmented print spooler for controlling and managing the processing of the print job and for directing the print job to a target device and 2) a target device for printing the print job.

An advantage of the present invention is that it provides a method for sending a print job from a Windows® 2000 platform client to a print server, comprising the following steps: 1) initiating the print job from an application on the Windows® 2000 platform client, 2) collecting a plurality of print job attributes for the print job on the Windows® 2000 platform client, 3) communicating the print job attributes from the Windows® 2000 platform client to the print server, and 4) rendering the print job according to the print job attributes on the print server.

Another advantage of the present invention is that it provides a method for sending a print job from an application on a Windows® 2000 platform to a local printing device, comprising the following steps: 1) initiating the print job from the application, 2) selecting distribution of the print job to multiple recipients, 3) collecting a plurality of print job attributes related to distribution information for the multiple recipients of the print job, 4) rendering the print job according to the print job attributes, and 5) generating a plurality of copies of the print job, one for each of the multiple recipients.

BRIEF DESCRIPTION OF THE DRAWINGS

Other aspects of the present invention will become apparent from its description and upon reference to the drawings provided. However, the drawings are only for purposes of illustrating embodiments of the present invention and are not to be construed as limiting the present invention.

DETAILED DESCRIPTION OF THE INVENTION

In describing the present invention, the following terms have been used:

"Print server" refers to a computer with a local print queue that is shared with other users in a networked environment.

"Client" refers to a computer using a remote print queue to direct print jobs to a print server in a networked environment. As such, the computer is a client of the print server.

"User interface wrapper" refers to a software module that augments a standard print driver within a standard operating system printing architecture by creating hooks and enabling additional functionality and enhancements to be defined and implemented beyond those in the standard user interface.

"Agent service" refers to a software module on a print server that augments the standard operating system printing architectures on both a client and a print server in the networked environment. The software module receives print job attributes from the client that are collected when a print job is initiated and enables the print server to properly process the print job according to the desired print job attributes.

Figure 1:
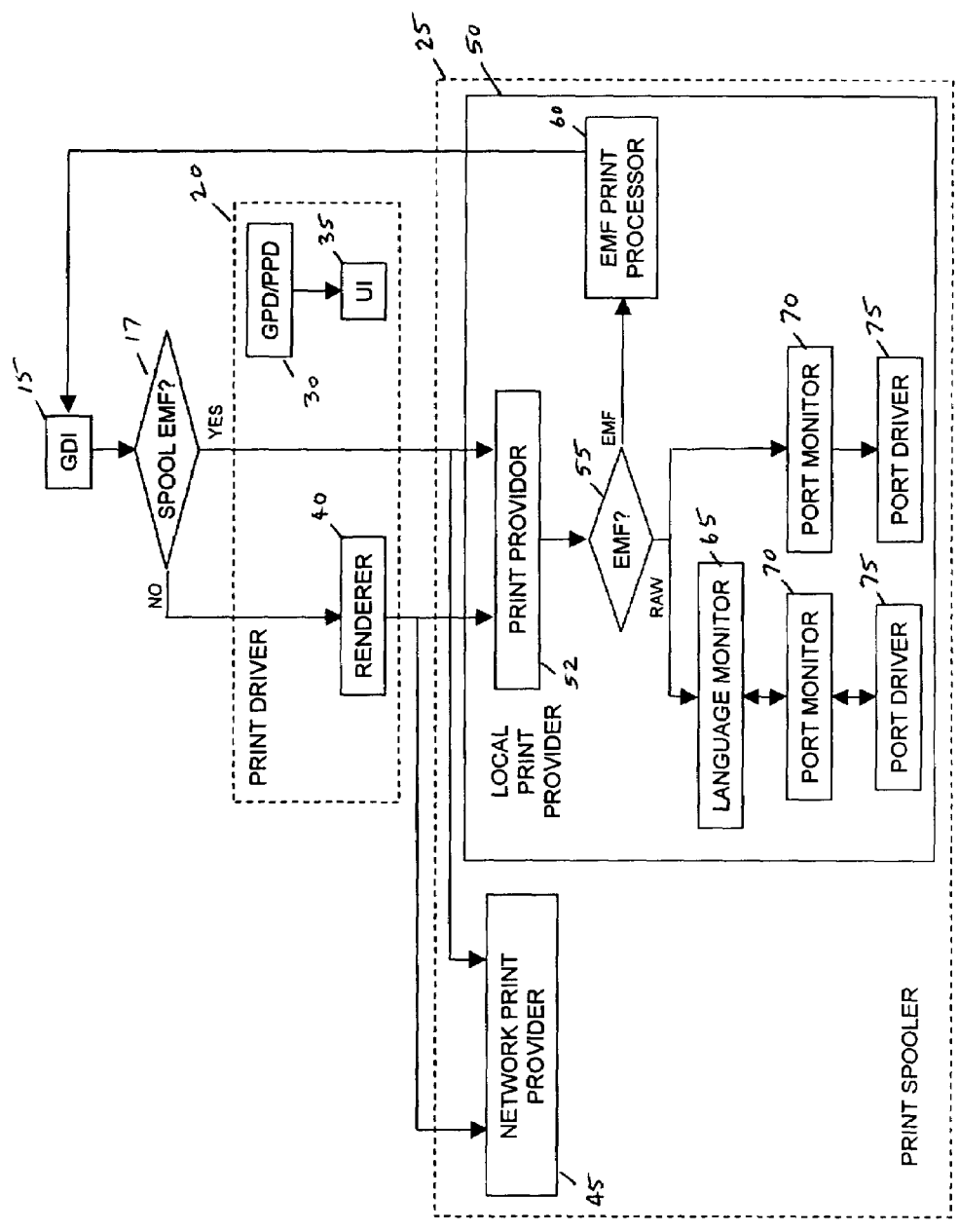
FIG. 1 shows a block diagram of the standard version of the Windows® 2000 printing architecture 10 for a universal print driver or a postscript print driver.
Figure 2:
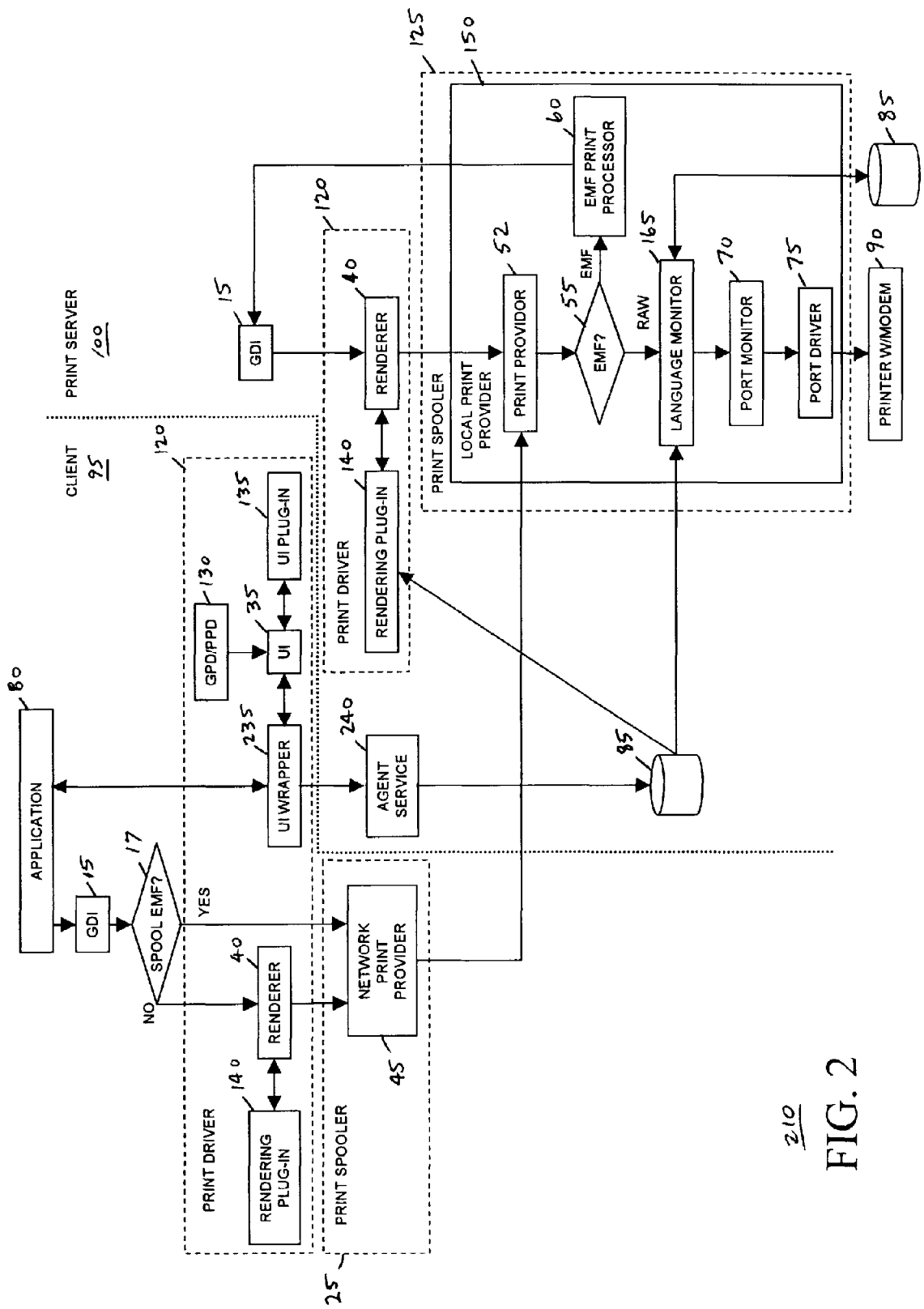
FIG. 2 shows a block diagram of an augmented Windows® 2000 printing architecture incorporating features of the present invention in a networked environment 210.

Turning now to the drawings, where like numerals designate like components, FIG. 2 is a block diagram of an augmented Windows® 2000 printing architecture that incorporates features of the present invention in a networked environment 210. The networked environment 210 includes a computer with a local printer that also includes a modem ("printer w/modem") 90. This computer is configured as a print server 100 and one or more additional computers on the network are configured as clients 95 of the print server 100. The Windows® 2000 operating system with an augmented printing architecture is installed on the client 95 and the print server 100.

The augmented local print provider 150 further includes the standard print provider 52, the standard process for determining if the print job is in EMF format 55, the standard EMF print processor 60, a custom language monitor 165, the standard port monitor 70, and the standard port driver 75.

The Windows® 2000 printing architecture is designed to permit print drivers to be added for target devices by creating custom printer definition files (GPD/PPD files). Custom GPD files describe the print features of a target device for printing from Windows® 2000 using the universal print driver. Custom PPD files describe the print features for printing from Windows® 2000 using the postscript print driver. Custom printer definition files are provided in the present invention, creating the custom GPD/PPD files 130. The custom GPD/PPD files 130 serve to augment the printing architecture by defining additional and enhanced functionality supported by the present invention. The UI 35 and the renderer 40 of the Windows® 2000 printing architecture are designed with hooks to permit the UI plug-in 135 and the rendering plug-in 140 to provide enhancements beyond the components of the standard print driver 20. The addition of the UI plug-in 135 and the rendering plug-in 140 in the augmented print driver 120 also serve to augment the printing architecture. The Windows® 2000 printing architecture permits the UI wrapper 235 to be added between an application 80 and the standard UI 35. The printing architecture also permits the UI wrapper 235 to create additional hooks to other Windows® 2000 operating system functions (i.e., application program interface (API) functions) that are not available in the standard UI 35. Such additional hooks enable the UI plug-in 135, in conjunction with the UI wrapper 235, to provide even further enhancements beyond the standard print driver 20.

The Windows® 2000 printing architecture is also designed to permit components of the standard print spooler 25 to be replaced and for such replacement components to provide additional and enhanced functionality. The custom language monitor 165 replaces the standard language monitor 65 and provides enhancements that augment the printing architecture.

Continuing to refer to FIG. 2, the general scenario where the networked environment 210 utilizes the present invention is where a user on the client 95 sends a print job from the application 80 to the printer w/modem 90 on the print server 100.

Examples of print job attributes that augment the printing architecture under the present invention include: 1) print job accounting information and 2) distribution information for multiple recipients. The data elements captured for print job accounting may include charge account codes, user identification, client identification, printer identification, and date/time stamping. Once captured, such accounting information is useful for allocating direct costs to projects and other client matters. Accordingly, collection and processing of such accounting information is an integral part of a business-to-business accounting system. Distribution information may be used to send the print job as a fax via modem to multiple recipients. The data elements for such distribution information may include recipient name, subject, telephone number, sender name, date/time stamping, and a comment field. The present invention also contemplates and extends to any specific scenario where information concerning the print job and/or target device is collected on the client 95 and not included in the EMF-formatted print job sent to the print server 100 for rendering.

The UI wrapper 235 indexes the print job attributes to the print job and notifies the print server 100 of the pending print job. The agent service 240 on the print server 100 monitors the network for transmissions from the UI wrapper 235. Once the agent service 240 recognizes and acknowledges such a transmission is pending, the agent service 240 and the UI wrapper 235 negotiate transfer of the indexed print job attributes over the network. The agent service 240 stores the indexed print job attributes in temporary files on the storage device 85.

Meanwhile, the print job passes from the application 80 through GDI 15 and the process for determining if the print job is in EMF format and selected for spooling 17 routes it to either the augmented print driver 120 or the standard network print provider 45. If the print job is in EMF format and selected for spooling, the print job is routed to the standard network print provider 45. Otherwise, it is routed through the augmented print driver 120, utilizing the rendering plug-in 140 whenever the new or enhanced functionality it provides is required, and then to the standard network print provider 45. The standard network print provider 45 sends the print job to the print server 100. The augmented local print provider 150 on the print server 100 receives the print job and the standard print provider 52 creates a spool file. Next, the print job is advanced to the standard process for determining if the print job is in EMF format 55. If the print job is in EMF format, it is routed to the standard EMF print processor 60 and sent to the standard GDI 15 and the augmented print driver 120 for rendering in RAW format on the print server 100. Otherwise, it is routed to the custom language monitor 165.

When the print job reaches the standard renderer 40 it defers to definitions and functionality provided by the rendering plug-in 140. The rendering plug-in 140 checks the temporary files created by the agent service 240 for indexed print job attributes that cross-reference to the current print job being rendered. The rendering plug-in 140 retrieves print job attributes from temporary files that match the current print job. The augmented print driver 120 renders the print job according to the definitions and functionality identified for the specific information associated with the print job attributes at the time the print job was initiated.

Once rendering is completed, the RAW-formatted print job is returned to the augmented print spooler 125 and routed to the custom language monitor 165. The custom language monitor 165 provides the augmented printing architecture with the ability to send a print job to multiple recipients. Since the language monitor 65 provides a full duplex communication path between the print spooler 25 and target devices and can also add printer control information to the print job, the custom language monitor 165 is used to recognize when a print job has been directed to multiple recipients and, when it has, create temporary copies of the print job on the storage device 85 for each intended recipient. An example of when a print job is directed to multiple recipients is when a print job is sent as a fax via modem to multiple recipients.

In the networked environment 210, when the custom language monitor 165 receives a print job it checks the temporary files created by the agent service 240 for indexed print job attributes that cross-reference to the current print job being rendered. If the current print job is matched to a temporary file, the custom language monitor 165 retrieves instructions to send the print job to multiple recipients contained in such print job attributes from temporary files on the storage device 85. As discussed, if the print job has been directed to multiple recipients, the custom language monitor 165 creates multiple copies of the print job. Next, the custom language monitor 165 routes a first copy of the print job along with instructions directing it to the first recipient to the standard port monitor 70. The standard port monitor 70 directs the print job through the standard port driver 75 to the printer w/modem 90. The custom language monitor 165, standard port monitor 70, and standard port driver 75 then routes a second copy to a second recipient via the printer w/modem 90 in like fashion and continues routing copies to each recipient according to the intended distribution of the print job.

If no temporary files exist for the current print job or if the temporary files created by the agent service 240 do not indicate that the print job is directed to multiple recipients, the custom language monitor 165 simply routes the print job to the standard port monitor 70. As in the distribution of multiple copies, the standard port monitor 70 directs the print job through the standard port driver 75 to the printer w/modem 90.

Figure 3:
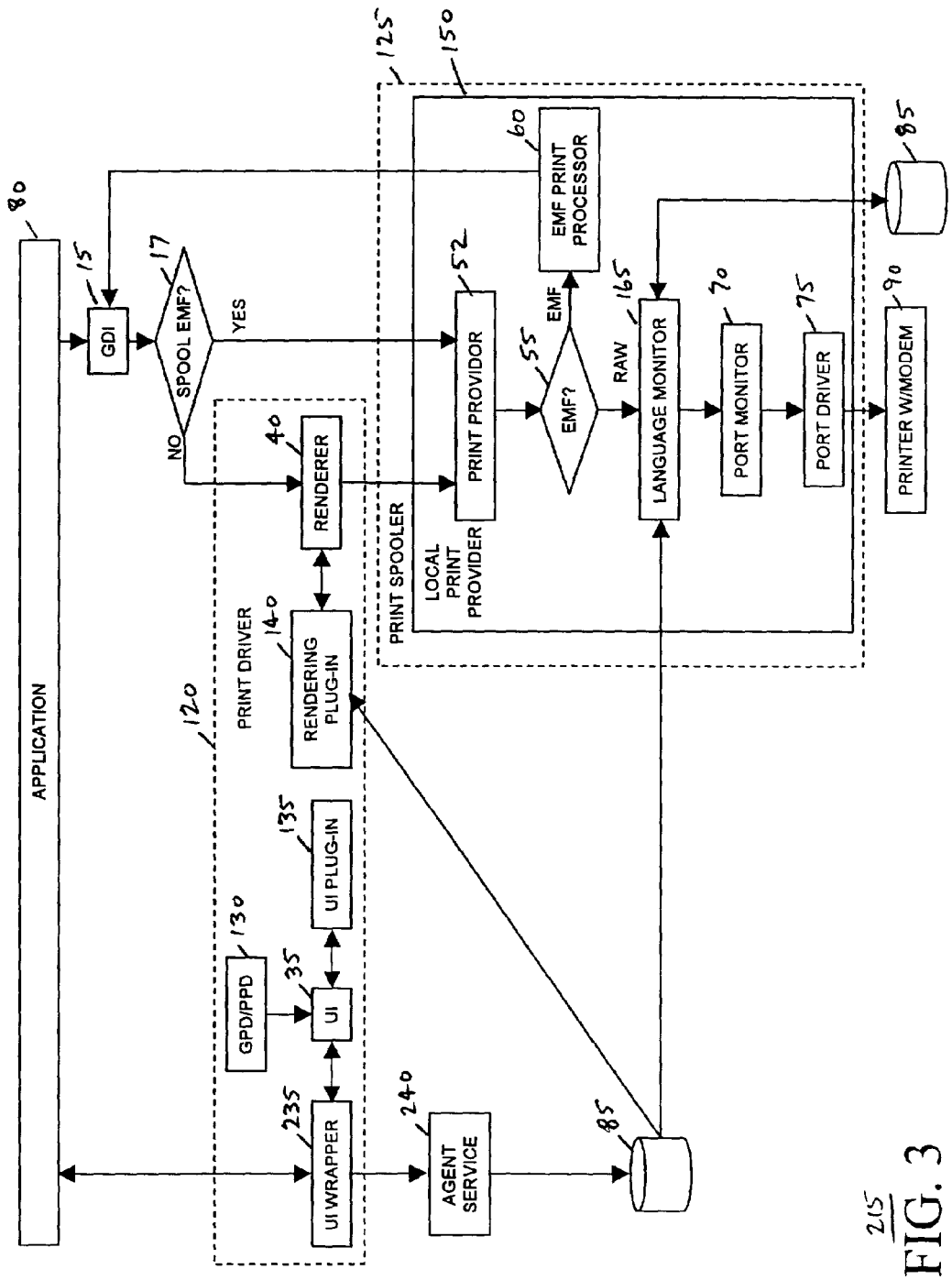
FIG. 3 shows a block diagram of an augmented Windows® 2000 printing architecture incorporating features of the present invention in a local print queue 215.

Referring to FIG. 3, where like numerals designate like components, a block diagram of an augmented Windows® 2000 printing architecture that incorporates features of the present invention in a local print queue 215 is provided. The local print queue resides on a computer connected to a printer w/modem 90. If the computer is in a networked environment 210, the printer w/modem 90 may, alternatively, be connected directly to the network. Regardless, the computer may or may not be in a networked environment 210 and the local print queue may or may not be shared in the configuration being described. The Windows® 2000 operating system with an augmented printing architecture is installed on the computer. The augmented printing architecture includes the components previously identified in the augmented printing architecture for the networked environment 210 of FIG. 2.

Continuing to refer to FIG. 3, the general scenario where the local print queue 215 utilizes the present invention is where a user on the local computer sends a print job from the application 80 to multiple recipients via the printer w/modem 90. The application 80, standard GDI 15, components of the augmented print driver 120, components of the augmented print spooler 125, and storage device 85 operate in relatively the same fashion as described for print jobs directed to multiple recipients in the networked environment of FIG. 2. The obvious difference is that all operations of the augmented print driver 120 and the augmented print spooler 125 are performed in the same computer.

Since the standard Windows® 2000 printing architecture does not support rendering the print job to multiple recipients, the custom language monitor 165 must be called upon to recognize that the user has directed the print job to multiple recipients and create multiple copies of the print job in the same fashion as described for the networked environment 210 of FIG. 2. Likewise, the standard port monitor 70 sequentially directs each copy of the print job through the standard port driver 75 to the printer w/modem 90 as described for the networked environment 210 of FIG. 2.

In an embodiment, a computer printing system for xerographic printing includes a computer operating in a Windows® 2000 environment with an augmented Windows® 2000 printing architecture, wherein the augmented Windows® 2000 printing architecture further includes; a standard print driver with enhancements for collecting a plurality of print job attributes when a print job is initiated; a standard print spooler with enhancements for controlling and managing the processing of the print job, and for directing the print job to a target device; and an electrophotographic printer serving as the target device for receiving the print job, wherein the electrophotographic printer further includes an imaging and exposing station; a photoreceptor; a developing station; a transferring station; and a fusing station.

It is therefore apparent that, in accordance with the present invention, there has been described herein an augmented operating system printing architecture. While the present invention is described in connection with the Windows® 2000 operating system, it is not intended to limit the present invention to this embodiment. On the contrary, it is intended for the present invention to apply to all alternatives, modifications, and equivalents as may be included within the spirit and scope of this description and the appended claims. The present invention is indeed applicable to other operating system, such as the Windows NT® operating system, particularly in regard to the operating system implemented on the print server 100 in the networked environment 210 (Windows NT is a trademark of Microsoft Corp., Redmond, Wash.). Obviously further alterations, modification, and equivalents will occur to those of ordinary skill in the art upon review of the description of the present invention. It is intended to embrace all such alterations, modification, and equivalents within the spirit and scope of the appended claims.

Having described the present invention, we now claim:

1. A method for sending a print job from an application on a Windows ® 2000 platform to a local print queue, comprising the following steps:
   a) initiating the print job from the application;
   b) selecting distribution of the print job to multiple recipients;
   c) collecting a plurality of print job attributes and communicating the print job to a print server, wherein the plurality of print job attributes include distribution information, the distribution information including information necessary for sending the print job to multiple recipients and communicating the plurality of print job attributes to an agent service module operatively connected to the print server;
   d) rendering the print job on the print server according to the print job attributes;
   e) generating a plurality of copies of the print job, one for each of the multiple recipients; and
   f) directing the print job to a target device, wherein the target device is an electrophotographic printer which further includes;
   an imaging and exposing station;
   a photoreceptor;
   a developing station;
   a transferring station; and,
   a fusing station.

* * * * *